(12) United States Patent
Chuang et al.

(10) Patent No.: US 12,720,404 B2
(45) Date of Patent: Aug. 25, 2026

(54) ELECTRONIC DEVICE THAT IMPROVES WIRELESS NETWORK TRANSMISSION QUALITY AND OPERATING METHOD THEREFOR

(71) Applicant: ASUSTeK COMPUTER INC., Taipei (TW)

(72) Inventors: Jui-Ting Chuang, Taipei (TW); Tz-Shiang Hung, Taipei (TW); Kai-Min Lin, Taipei (TW); Yu-Chen Lee, Taipei (TW); Ming-Hung Chung, Taipei (TW); Yao-Hsun Huang, Taipei (TW)

(73) Assignee: ASUSTEK COMPUTER INC., Taipei City (TW)

( * ) Notice: Subject to any disclaimer, the term of this patent is extended or adjusted under 35 U.S.C. 154(b) by 333 days.

(21) Appl. No.: 18/502,031

(22) Filed: Nov. 5, 2023

(65) Prior Publication Data

US 2025/0039764 A1 Jan. 30, 2025

(30) Foreign Application Priority Data

Jul. 28, 2023 (TW) ................................ 112207993

(51) Int. Cl.
*H04W 40/16* (2009.01)
*H04W 84/12* (2009.01)

(52) U.S. Cl.
CPC ............ *H04W 40/16* (2013.01); *H04W 84/12* (2013.01)

(58) Field of Classification Search
CPC .................................................... H04W 40/16
See application file for complete search history.

(56) References Cited

U.S. PATENT DOCUMENTS 7,999,738 B2 8/2011 Melconian et al.
11,804,644 B2 * 10/2023 Song .................... H01Q 1/1257
(Continued)

FOREIGN PATENT DOCUMENTS

CN 104375135 B 2/2017
CN 104684072 B 3/2018
(Continued)

*Primary Examiner* — Guang W Li
(74) *Attorney, Agent, or Firm* — McClure, Qualey & Rodack, LLP

(57) ABSTRACT

In an electronic device provided in the disclosure, an external antenna device includes at least one directional antenna, a wireless communication module is electrically connected to the external antenna device, and a processing circuit is electrically connected to the wireless communication module. The processing circuit collects broadcast information of all wireless routers in a current environment through the wireless communication module and the external antenna device; the processing circuit selects one of the wireless routers with the lowest interference based on the broadcast information for connection, and then rotates the external antenna device sequentially according to a plurality of azimuth angles, so that the processing circuit obtains reference information corresponding to the wireless communication module through the directional antenna; and the processing circuit selects an azimuth angle corresponding to the maximum reference information as an optimal azimuth angle to rotate the external antenna device to the optimal azimuth angle.

20 Claims, 5 Drawing Sheets

(56) References Cited

U.S. PATENT DOCUMENTS

2015/0015435 A1 1/2015 Shen et al.
2015/0372740 A1* 12/2015 Ko ........................ H04B 7/0665 370/329
2016/0381570 A1* 12/2016 Lysejko ................. H01Q 21/08 455/562.1
2020/0036413 A1* 1/2020 Deutsch ................ H04W 28/08
2021/0359411 A1* 11/2021 Hwang .................. H01Q 21/28
2022/0085868 A1* 3/2022 Facca ................. H04B 7/15507
2022/0263226 A1* 8/2022 Kim ......................... C08K 7/14
2022/0264319 A1* 8/2022 Liu ...................... H04B 17/318
2024/0250735 A1* 7/2024 Kalyanasundaram ....................... H04B 7/0628

FOREIGN PATENT DOCUMENTS

CN 111277293 A 6/2020
CN 110933629 B 6/2021
WO 2018/146064 A1 8/2018

* cited by examiner

ELECTRONIC DEVICE THAT IMPROVES WIRELESS NETWORK TRANSMISSION QUALITY AND OPERATING METHOD THEREFOR

CROSS-REFERENCE TO RELATED APPLICATION

This application claims the priority benefit of Taiwan application serial No. 112207993, filed on Jul. 28, 2023. The entirety of the above-mentioned patent application is hereby incorporated by reference herein and made a part of the specification.

BACKGROUND OF THE DISCLOSURE

Field of the Invention

The disclosure relates to an electronic device that improves wireless network (WI-FI) transmission quality and an operating method therefor.

Description of the Related Art

In a general wireless network (WI-FI) environment, there may be many different types of obstacles on a path from a WI-FI signal source to a user device, which leads to communication dead spots in a specific region. Further, current WI-FI provides a higher transmission rate, so that a wider bandwidth and a higher operating frequency are used. However, a high-frequency signal is more likely to be attenuated by environmental influences, making communication dead spots more likely to occur.

In an existing practice, functions of a wireless router (AP Router) (main control terminal) are mainly relied on to improve the transmission quality of the wireless network. In an embodiment, an automatic channel selection function is used to select channels with less interference, or a quality of service (QoS) function is used to increase a bandwidth of a specific application. However, the functions of the wireless router do not take into account an impact of wireless parameters of a user device (client) (such as an antenna pattern, polarization, network interface card power, a quantity of access points, and access point channel utilization).

BRIEF SUMMARY OF THE INVENTION

The disclosure provides an electronic device that improves wireless network transmission quality, including an external antenna device, a wireless communication module, and a processing circuit. The external antenna device includes at least one directional antenna, the wireless communication module is electrically connected to the external antenna device, and the processing circuit is electrically connected to the wireless communication module. The processing circuit collects broadcast information of all wireless routers in a current environment through the wireless communication module and the external antenna device; the processing circuit selects one of the wireless routers with the lowest interference based on the broadcast information for connection, and then rotates the external antenna device sequentially according to a plurality of azimuth angles, so that the processing circuit obtains reference information corresponding to the wireless communication module through the directional antenna; and the processing circuit selects an azimuth angle corresponding to the maximum reference information as an optimal azimuth angle to rotate the external antenna device to the optimal azimuth angle.

The disclosure further provides an operating method that improves wireless network transmission quality, which is applied to an electronic device. The electronic device includes an external antenna device and a wireless communication module, and the external antenna device includes at least one directional antenna. The operating method includes: collecting broadcast information of all wireless routers in a current environment through the wireless communication module and the external antenna device, and selecting one of the wireless routers with the lowest interference based on the broadcast information for connection; rotating the external antenna device sequentially according to a plurality of azimuth angles to obtain reference information corresponding to the wireless communication module through the directional antenna; and selecting an azimuth angle corresponding to the maximum reference information as an optimal azimuth angle to rotate the external antenna device to the optimal azimuth angle.

In summary, the disclosure relates to an electronic device that improves wireless network transmission quality and an operating method therefor. According to the disclosure, when a WI-FI network is used, characteristics of concentrated radiation energy of a directional antenna are used to develop a corresponding algorithm, to select channels with lower interference for the current environment. A main beam of the directional antenna is adjusted based on a received signal strength indicator (RSSI) to an optimal azimuth angle for receiving signals on a plane, to improve a transmission rate and stability of the wireless network and improve the transmission quality of the wireless network.

DETAILED DESCRIPTION OF THE EMBODIMENTS

Figure 1:
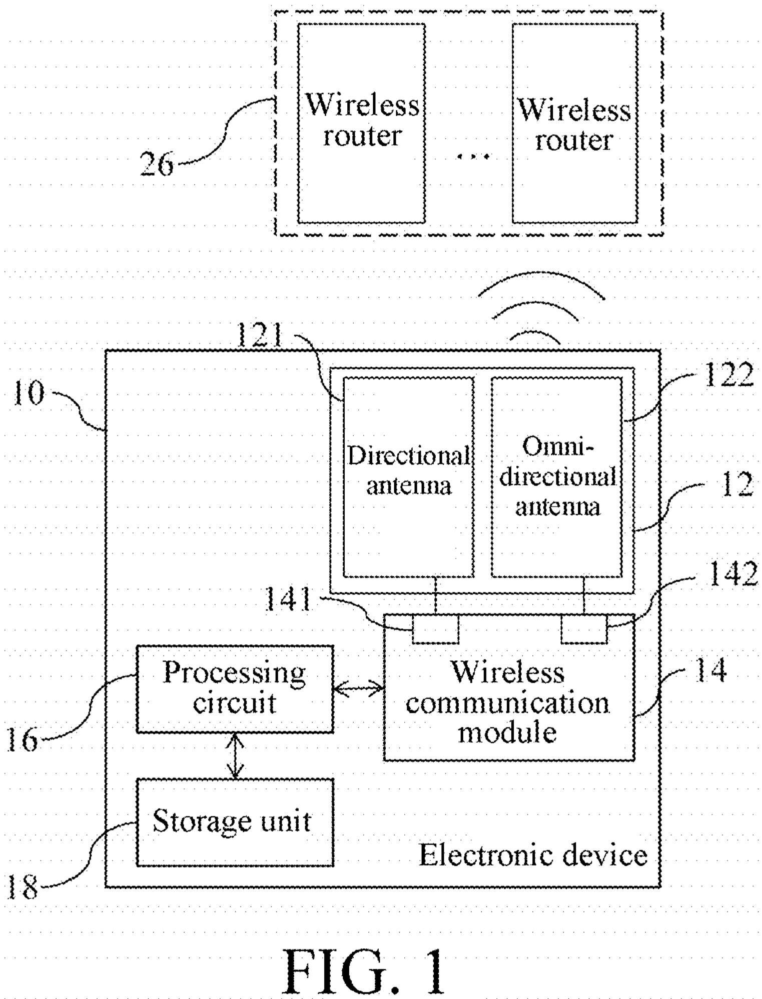
FIG. 1 is a schematic circuit block diagram of an electronic device that improves wireless network transmission quality according to an embodiment of the disclosure.

Embodiments of the disclosure are described with reference to relevant drawings. In addition, some components and structures are omitted in the drawings in the embodiments to clearly show the technical features of the disclosure. The same reference numbers in the drawings represent the same or similar components or circuits. It should be understood that although terms such as “first”, “second” in this specification may be used for describing various elements, components, areas, or functions, the elements, components, areas, or functions are not limited by such terms.

The terms are only used to distinguish one element, component, area, or function from another element, component, area, or function.

Referring to FIG. 1, an electronic device 10 that improves wireless network transmission quality includes an external antenna device 12, a wireless communication module 14, a processing circuit 16, and a storage unit 18. In the electronic device 10, the external antenna device 12 includes at least one directional antenna 121. In this embodiment, FIG. 1 shows an example in which the external antenna device 12 includes one directional antenna 121 and one omni-directional antenna 122, but the disclosure is not limited thereto. The wireless communication module 14 is electrically connected to the external antenna device 12, and the processing circuit 16 is electrically connected to the wireless communication module 14 and the storage unit 18. When the electronic device 10 is in a file front environment, and a plurality of wireless routers (AP Routers) 26 are provided in a current environment, the processing circuit 16 collects broadcast information of all wireless routers 26 in the current environment through the wireless communication module 14 and the external antenna device 12. In an embodiment, the broadcast information includes at least channel utilization (Channel Utilization, CU) information, and the channel utilization information is defined by IEEE. A higher channel utilization value indicates a higher use frequency of the channel currently, which may be used as a basis for determining channel interference. The processing circuit 16 selects a channel of one of the wireless routers with the lowest interference based on the channel utilization information for connection, and then rotates the external antenna device 12 sequentially according to a plurality of azimuth angles, so that the processing circuit 16 obtains reference information corresponding to the wireless communication module 14 through the directional antenna 121, where the reference information is received signal strength indicator (RSSI) information. After obtaining received signal strength indicator information corresponding to each azimuth angle, the processing circuit 16 stores each azimuth angle and the reference information corresponding to each azimuth angle in the storage unit 18, and then the processing circuit 16 selects an azimuth angle corresponding to the maximum received signal strength indicator information as an optimal azimuth angle to rotate the external antenna device 12 to the optimal azimuth angle.

Figure 2:
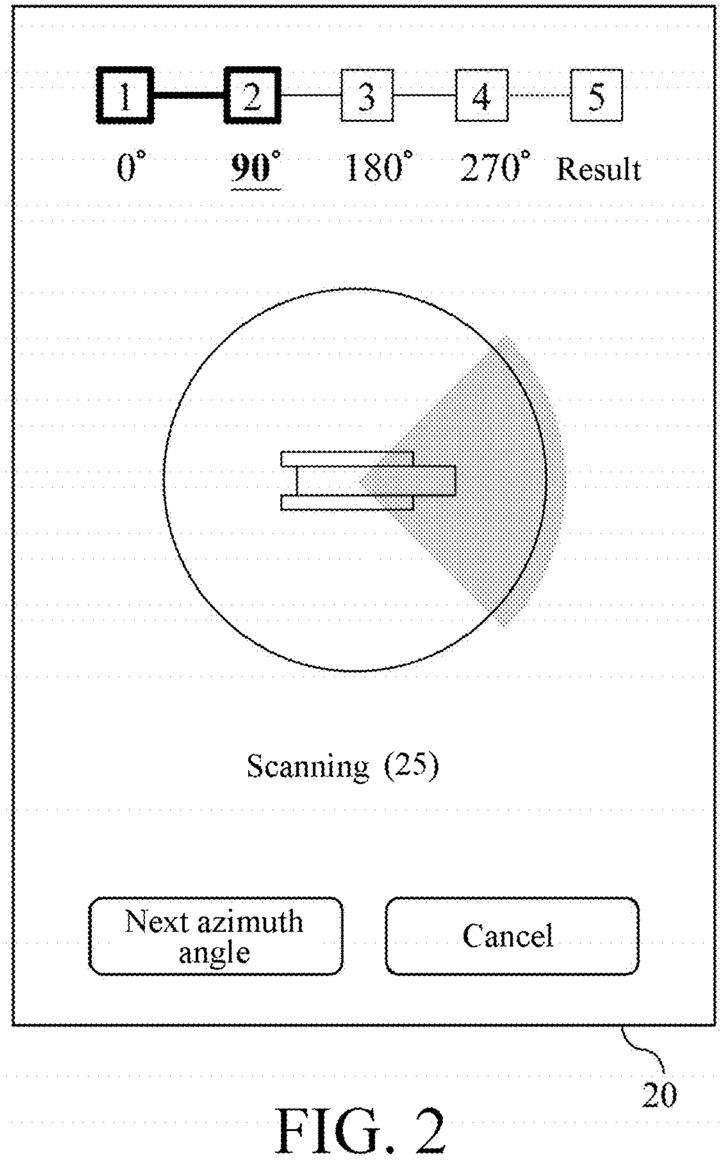
FIG. 2 is a schematic diagram of a user interface provided by a processing device in an electronic device according to an embodiment of the disclosure.

In an embodiment, referring to both FIG. 1 and FIG. 2, in the electronic device 10, the processing circuit 16 further provides a graphical interface 20 to guide a user to manually rotate the external antenna device 12 to a position of a correct azimuth angle through the graphical interface 20.

Figure 3:
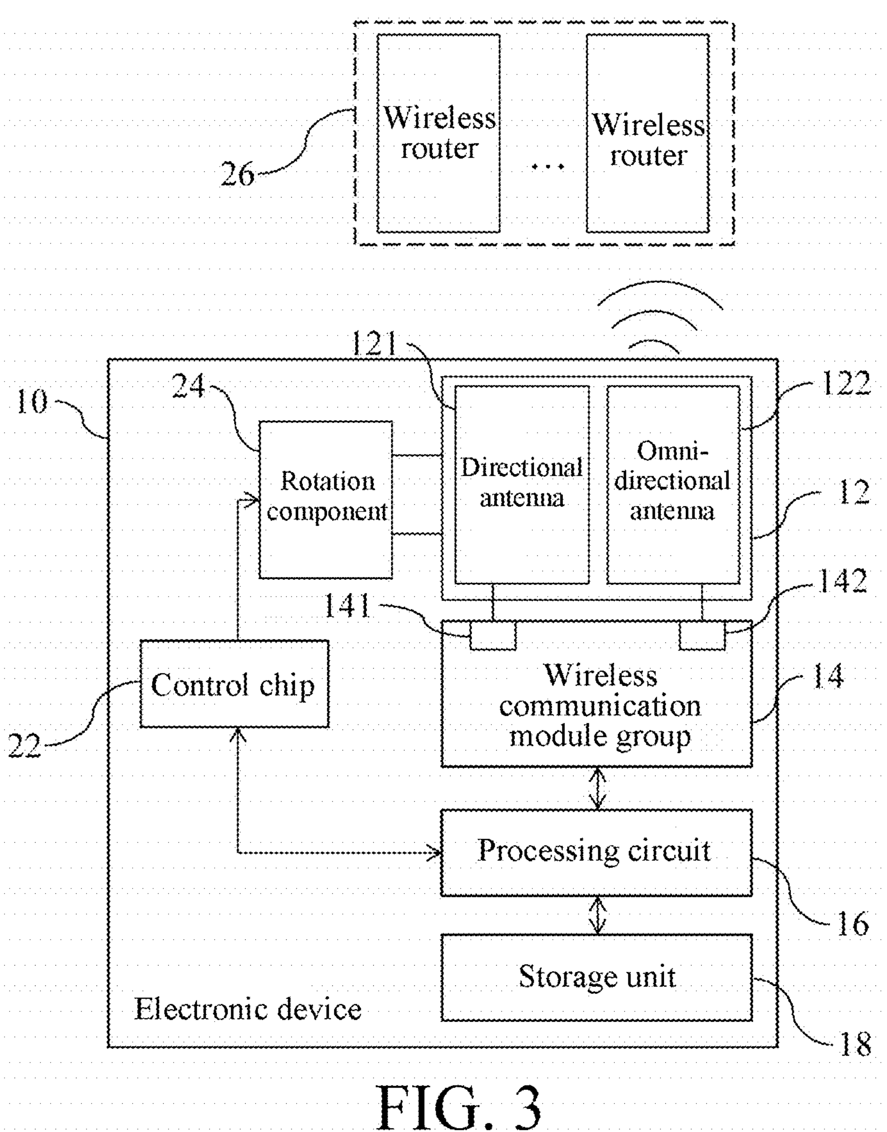
FIG. 3 is a schematic circuit block diagram of an electronic device that improves wireless network transmission quality according to another embodiment of the disclosure.

In an embodiment, referring to FIG. 3, the electronic device 10 further includes a control chip 22. The control chip 22 is electrically connected to the processing circuit 16, and the external antenna device 12 is further provided with a rotation component 24, so that the rotation component 24 automatically drives the external antenna device 12 to rotate. The control chip 22 is electrically connected to the rotation component 24 to control the rotation component 24 to rotate. When the external antenna device 12 is ready to rotate sequentially according to each azimuth angle, or when the external antenna device 12 is to be rotated to an optimal azimuth angle, the processing circuit 16 generates a control signal to the control chip 22, and the control chip 22 drives and controls the rotation component 24 to operate based on the control signal, thereby driving the external antenna device 12 to rotate. In an embodiment, the rotation component 24 may be a component that can drive the external antenna device 12 to rotate, such as an antenna base gear, a motor drive circuit, or a step motor, but the disclosure is not limited thereto.

In an embodiment, the electronic device 10 may be a personal computer, a notebook computer, or a tablet computer, but the disclosure is not limited thereto.

In an embodiment, as shown in FIG. 1 or FIG. 3, the wireless communication module 14 is a common wireless network interface card, such as a wireless network (WIFI) network interface card or a wireless wide area network (WWAN) network interface card, to support a wireless communication technology, but the disclosure is not limited thereto. The common wireless network interface card generally includes two ports, namely a primary port and a secondary port, but a connection relationship between the two ports and the external antenna device 12 varies depending on an installation position by the user. Based on this, in this embodiment, the wireless communication module 14 includes a first port 141 and a second port 142 for connecting the directional antenna 121 and the omni-directional antenna 122 respectively. When the first port 141 is the primary port, the second port 142 is the secondary port. On the contrary, when the first port 141 is the secondary port, the second port 142 is the primary port. The disclosure is not limited thereto. In another embodiment, the wireless communication module 14 further includes more than two ports. In an embodiment, an Apple Macbook Air computer includes three ports, and a few wireless wide area network modules include four ports. Therefore, the disclosure uses an example in which the wireless communication module 14 includes two ports, but is not limited to two ports, and calculation mechanisms of software are the same.

In an embodiment, the processing circuit 16 may be but is not limited to a central processing unit (CPU), an embedded controller (EC), a microprocessor, a digital signal processor (DSP), an application-specific integrated circuit (ASIC), a system on a chip (SOC), or another similar component or combination. The disclosure is not limited thereto.

In an embodiment, the storage unit 18 is a repeatedly read-write and non-transitory memory, such as a flash memory, a solid-state drive, or a micro hard drive, but the disclosure is not limited thereto.

Figure 4:
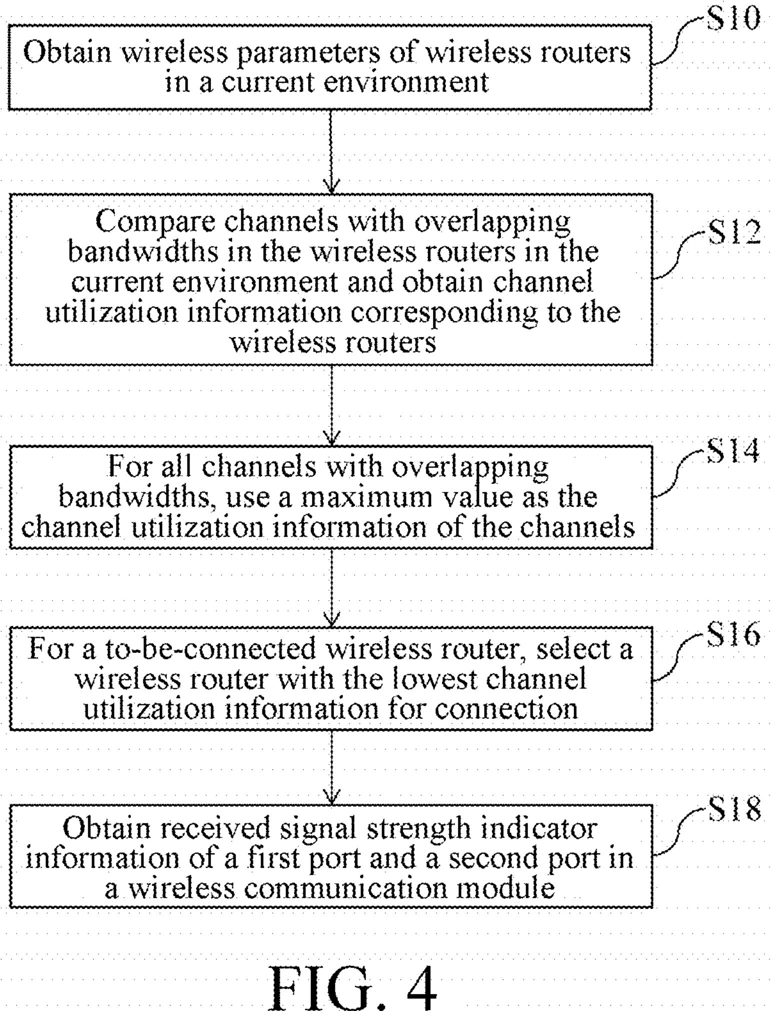
FIG. 4 is a schematic flowchart of the first half of an operating method that improves wireless network transmission quality according to an embodiment of the disclosure.

Referring to FIG. 1, FIG. 3, and FIG. 4 together, a detailed process of an operating method that improves wireless network transmission quality is shown in step S10 to step S30. The operating method is applied to the electronic device 10. The processing circuit 16 of the electronic device 10 includes a built-in algorithm, and the operating method is performed according to the algorithm. First, as shown in step S10, the processing circuit 16 of the electronic device 10 obtains wireless parameters in the broadcast information of all wireless routers 26 in the current environment through the external antenna device 12 and the wireless communication module 14, including a channel, a bandwidth, and channel utilization information of the wireless router 26. As shown in step S12, for channels and bandwidths of WI-FI, channels with overlapping bandwidths of the wireless routers 26 are compared in the current environment, and corresponding channel utilization information (broadcast information) is obtained. As shown in step S14, for all channels with overlapping bandwidths, the maximum channel utilization information is used as the channel utilization information of the channels. Then, as shown in step S16, for a to-be-connected wireless router 26, a wireless router 26 corresponding to a channel with the lowest channel utilization information is selected for connection, thereby selecting the wireless router 26 with the lowest interference for connection.

Figure 5:
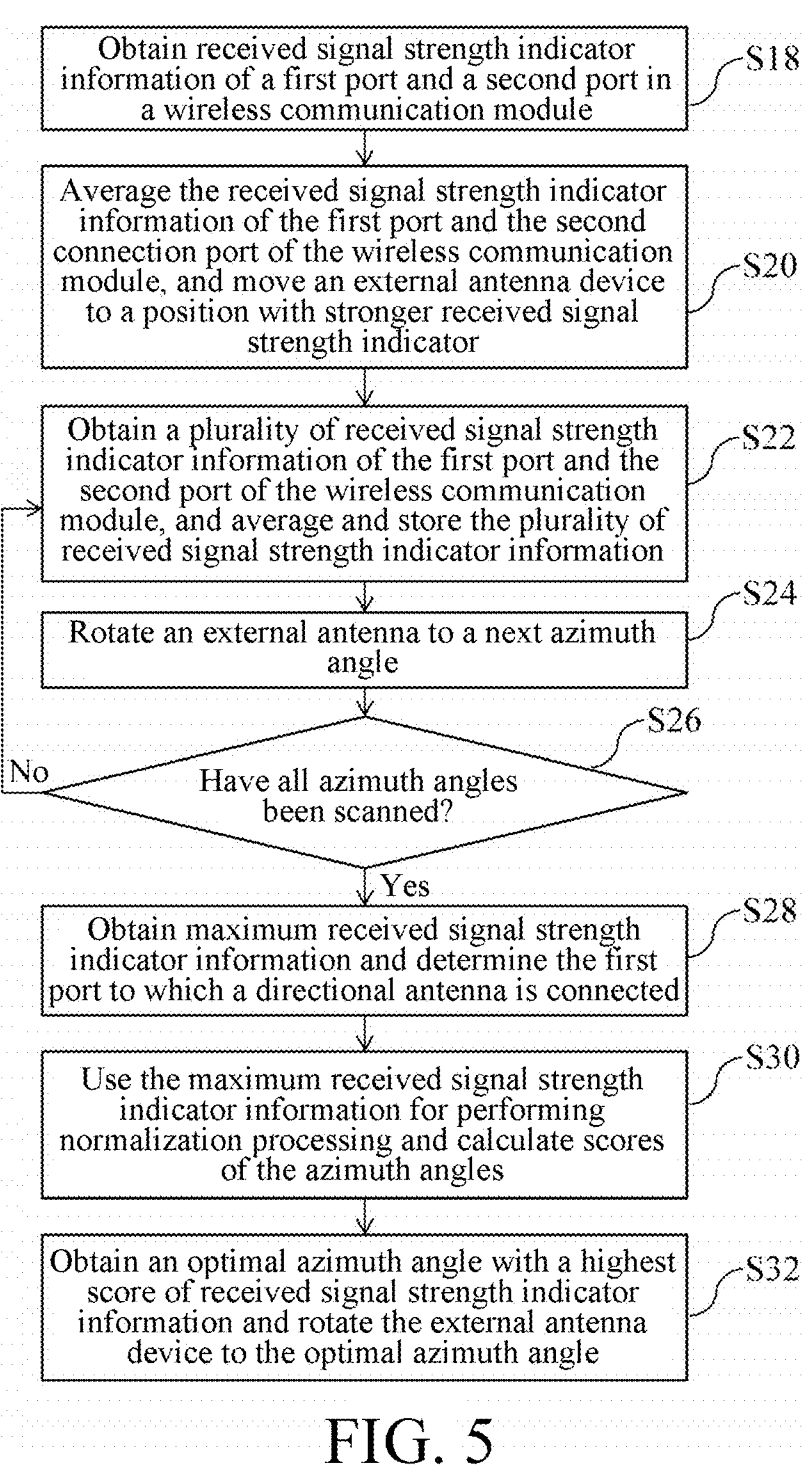
FIG. 5 is a schematic flowchart of the second half of an operating method that improves wireless network transmission quality according to an embodiment of the disclosure.

Referring to FIG. 1, FIG. 3, and FIG. 5 together, as shown in step S18, a software development kit (SDK) provided by an integrated circuit vendor (IC vender) is used to obtain received signal strength indicator (RSSI) information of the first port 141 and the second port 142 of the wireless communication module 14 in the electronic device 10. As shown in step S20, an average calculation is performed on the received signal strength indicator (RSSI) information of the first port 141 and the second port 142 of the wireless communication module 14, and the user is guided to move the external antenna device 12 to a position with a stronger received signal strength indicator. As shown in step S22, the processing circuit 16 obtains a plurality of pieces of received signal strength indicator (RSSI) information (reference information) of the first port 141 and the second port 142 in the wireless communication module 14 at an azimuth angle. In an embodiment, 30 pieces of received signal strength indicator (RSSI) information are received, and then averaged and stored in the storage unit 18. In step S24, the control chip 22 is used to control the rotation component 24 to drive the external antenna device 12 to rotate to a next azimuth angle, or the user is guided to rotate the external antenna device 12 to a correct azimuth angle through the graphical interface 20 shown in FIG. 2. As shown in step S26, the processing circuit 16 determines whether all azimuth angles of 360 degrees on a plane have been scanned. If the scanning has not been completed, return to step S22 to continue to obtain received signal strength indicator (RSSI) information of the next azimuth angle, and repeat the foregoing steps; or if all the scanning has been completed, continue to the next step S28. As shown in step S22 to step S26, in an embodiment, a position in front of the user may be defined as 0 degrees and a quantity of scanning angles as N, and a clockwise or counterclockwise order is (360/N)*0, (360/N)*1 . . . (360/N)*N−1 degrees. The received signal strength indicator (RSSI) information of the first port 141 and the second port 142 of the wireless communication module 14 at the N angles are measured, and each angle is averaged 30 times and stored in the storage unit 18. In an embodiment, when N=4, angles are measured at 0 degrees, 90 degrees, 180 degrees, and 270 degrees respectively, so that the processing circuit 16 can obtain the received signal strength indicator (RSSI) information of the first port 141 and the second port 142 in the wireless communication module 14 at each azimuth angle.

As shown in step S28, the processing circuit 16 obtains the maximum received signal strength indicator (RSSI) information, and determines the first port 141 to which the directional antenna 121 is connected based on the maximum received signal strength indicator information. In this step, the port where the directional antenna 121 is located can be determined. As shown in step S30, the processing circuit 16 uses the maximum received signal strength indicator (RSSI) information to perform normalization processing on the received signal strength indicator (RSSI) information of the first port 141 (the port where the directional antenna 121 is located), and calculates scores of the azimuth angles. The normalized formula is as follows:

$$\frac{RSSI\ 0^o}{RSSI\max}\times 100,$$

-continued $$\frac{RSSI\left(\frac{360}{N}\times 1\right)^o}{RSSI\max}\times 100,$$

$$\frac{RSSI\left(\frac{360}{N}\times 2\right)^o}{RSSI\max}\times 100\ \ldots\ \frac{RSSI\left(\frac{360}{N}\times (N-1)\right)^o}{RSSI\max}\times 100$$

$$RSSI\ \max = \mathrm{Max}\left(RSSI0^o,\ RSSI\left(\frac{360}{N}\times 1\right)^o,\ RSSI\left(\frac{360}{N}\times 2\right)^o\ \ldots\ldots\ RSSI\left(\frac{360}{N}\times (N-1)\right)^o\right).$$

Finally, as shown in step S32, an azimuth angle corresponding to the received signal strength indicator (RSSI) information with the highest score is obtained as the optimal azimuth angle, and the control chip 22 is used to control the rotation component 24 to drive the external antenna device 12 to rotate to the optimal azimuth angle, or the user is guided to rotate the external antenna device 12 to a correct optimal azimuth angle through the graphical interface 20 shown in FIG. 2. The optimal azimuth angle is an azimuth angle where the main beam of the directional antenna 121 is located.

According to the disclosure, the external antenna device with built-in software in the processing circuit is used to guide the user to manually or automatically point the main beam of the directional antenna to the optimal azimuth angle for best signal reception, which can improve the transmission quality of wireless transmission. The antenna is the best combination of a directional antenna and an omni-directional antenna. A comprehensive radiation pattern has complementary characteristics and can also avoid the problem of poor signal reception.

In summary, the disclosure relates to an electronic device that improves wireless network transmission quality and an operating method therefor. According to the disclosure, when a WI-FI network is used, characteristics of concentrated radiation energy of a directional antenna are used to develop a corresponding algorithm, to select channels with lower interference for the current environment. A main beam of the directional antenna is adjusted based on a received signal strength indicator (RSSI) to an optimal azimuth angle for receiving signals on a plane, to improve a transmission rate and stability of the wireless network and improve the transmission quality of the wireless network.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. An electronic device that improves wireless network transmission quality, comprising:

an external antenna device, comprising at least one directional antenna;

a wireless communication module, electrically connected to the external antenna device; and a processing circuit, electrically connected to the wireless communication module, wherein the processing circuit collects broadcast information of all wireless routers in a current environment through the wireless communication module and the external antenna device; the processing circuit selects one of the wireless routers with a lowest interference based on the broadcast information for connection, and then rotates the external antenna device sequentially according to a plurality of azimuth angles, so that the processing circuit obtains reference information corresponding to the wireless communication module through the directional antenna; and the processing circuit selects an azimuth angle corresponding to the maximum reference information as an optimal azimuth angle to rotate the external antenna device to the optimal azimuth angle.

2. The electronic device that improves wireless network transmission quality according to claim 1, wherein the external antenna device further comprises an omni-directional antenna.

3. The electronic device that improves wireless network transmission quality according to claim 2, wherein the wireless communication module further comprises a first port and a second port for connecting the directional antenna and the omni-directional antenna respectively.

4. The electronic device that improves wireless network transmission quality according to claim 3, wherein the processing circuit obtains a plurality of pieces of reference information of the first port and the second port in the wireless communication module at each azimuth angle, and averages the plurality of pieces of reference information respectively; and the processing circuit obtains the maximum reference information, determines the first port connected to the directional antenna according to the reference information, and then uses the maximum reference information to perform normalization processing on the reference information of the first port, to obtain an azimuth angle corresponding to the reference information with the highest score as the optimal azimuth angle, and rotate the external antenna device to the optimal azimuth angle.

5. The electronic device that improves wireless network transmission quality according to claim 1, wherein the reference information is received signal strength indicator (RSSI) information.

6. The electronic device that improves wireless network transmission quality according to claim 1, wherein the broadcast information comprises channel utilization information.

7. The electronic device that improves wireless network transmission quality according to claim 1, further comprising a control chip, wherein the control chip is electrically connected to the processing circuit, the external antenna device is further provided with a rotation component, and the control chip is electrically connected to the rotation component, so that the processing circuit drives and controls operation of the rotation component through the control chip to drive the external antenna device to rotate.

8. The electronic device that improves wireless network transmission quality according to claim 1, wherein the processing circuit further provides a graphical interface to guide a user to rotate the external antenna device to a corresponding azimuth angle.

9. The electronic device that improves wireless network transmission quality according to claim 1, further comprising a storage unit, electrically connected to the processing circuit to store the azimuth angles and reference information corresponding to the azimuth angles.

10. The electronic device that improves wireless network transmission quality according to claim 1, wherein the processing circuit compares channels with overlapping bandwidths of the wireless routers in the current environment and obtains corresponding broadcast information, uses the maximum broadcast information as broadcast information of the channels with overlapping bandwidths, and then selects the wireless router corresponding to the channel with the lowest broadcast information for connection.

11. An operating method that improves wireless network transmission quality, applied to an electronic device, wherein the electronic device comprises an external antenna device and a wireless communication module, the external antenna device comprises at least one directional antenna, and the operating method comprises:

collecting broadcast information of all wireless routers in a current environment through the wireless communication module and the external antenna device, and selecting one of the wireless routers with a lowest interference based on the broadcast information for connection;

rotating the external antenna device sequentially according to a plurality of azimuth angles to obtain reference information corresponding to the wireless communication module through the directional antenna; and selecting an azimuth angle corresponding to the maximum reference information as an optimal azimuth angle to rotate the external antenna device to the optimal azimuth angle.

12. The operating method that improves wireless network transmission quality according to claim 11, wherein the external antenna device further comprises an omni-directional antenna.

13. The operating method that improves wireless network transmission quality according to claim 12, wherein the wireless communication module further comprises a first port and a second port for connecting the directional antenna and the omni-directional antenna respectively.

14. The operating method that improves wireless network transmission quality according to claim 13, wherein the step of rotating the external antenna device sequentially according to a plurality of azimuth angles to obtain reference information corresponding to the wireless communication module through the directional antenna further comprises: obtaining a plurality of pieces of reference information of the first port and the second port in the wireless communication module at each azimuth angle, and averaging the plurality of pieces of reference information respectively to obtain the maximum reference information.

15. The operating method that improves wireless network transmission quality according to claim 14, wherein the step of selecting an azimuth angle corresponding to the maximum reference information as an optimal azimuth angle to rotate the external antenna device to the optimal azimuth angle further comprises: determining the first port connected to the directional antenna based on the maximum reference information, and then using the maximum reference information to perform normalization processing on the reference information of the first port, to obtain an azimuth angle corresponding to the reference information with the highest score as the optimal azimuth angle.

16. The operating method that improves wireless network transmission quality according to claim 11, wherein the reference information is received signal strength indicator (RSSI) information.

17. The operating method that improves wireless network transmission quality according to claim 11, wherein the broadcast information comprises channel utilization information.

18. The operating method that improves wireless network transmission quality according to claim 11, wherein the external antenna device is further provided with a rotation component for driving and controlling operation of the rotation component to drive the external antenna device to rotate.

19. The operating method that improves wireless network transmission quality according to claim 11, wherein before the step of rotating the external antenna device sequentially based on the azimuth angles, the method further comprises: providing a graphical interface to guide a user to rotate the external antenna device to a corresponding azimuth angle.

20. The operating method that improves wireless network transmission quality according to claim 11, wherein the step of selecting one of the wireless routers with the lowest interference based on the broadcast information for connection further comprises: comparing channels with overlapping bandwidths of the wireless routers in the current environment and obtaining corresponding broadcast information, using the maximum broadcast information as broadcast information of the channels with overlapping bandwidths, and selecting the wireless router corresponding to the channel with the lowest broadcast information for connection.

* * * * *